United States Patent [19]

Keogh

[11] Patent Number: 4,526,930

[45] Date of Patent: Jul. 2, 1985

[54] PRODUCTION OF WATER-CURABLE, SILANE MODIFIED THERMOPLASTIC POLYMERS

[75] Inventor: Michael J. Keogh, Bridgewater, N.J.

[73] Assignee: Union Carbide Corporation, Danbury, Conn.

[21] Appl. No.: 534,354

[22] Filed: Sep. 23, 1983

[51] Int. Cl.³ .................. C08L 51/06; C08L 43/04
[52] U.S. Cl. ....................... 525/105; 525/106; 525/288; 525/326.5; 525/370; 525/475; 528/25
[58] Field of Search .................. 525/288, 326.5, 370, 525/106, 475, 105; 528/25

[56] References Cited

U.S. PATENT DOCUMENTS

| | | | |
|---|---|---|---|
| 3,646,155 | 2/1972 | Scott | 525/288 |
| 3,697,551 | 10/1972 | Thomson | 260/349 |
| 4,291,136 | 9/1981 | Keogh | 525/102 |
| 4,328,323 | 5/1982 | Keogh | 525/106 |

*Primary Examiner*—Wilbert J. Briggs, Sr.
*Attorney, Agent, or Firm*—James C. Arvantes; Robert C. Brown

[57] ABSTRACT

The disclosure of this application is directed to water-curable, silane modified thermoplastic polymers, which are particularly useful as extrudates about wires and cables providing insulation or jacketing thereon, produced by reacting a mixture containing an organo titanate and a thermoplastic polymer having pendant silane moieties.

38 Claims, No Drawings

PRODUCTION OF WATER-CURABLE, SILANE MODIFIED THERMOPLASTIC POLYMERS

SUMMARY OF THE INVENTION

This invention relates to water-curable, silane modified thermoplastic polymers produced by reacting a relatively water-stable silane with a thermoplastic polymer to provide a relatively water-stable thermoplastic polymer having pendant silane moieties. The relatively water-stable, silane modified thermoplastic polymer is activated or made readily water-curable by the reaction therewith of an organo titanate having at least one readily hydrolyzable group, which ester exchanges with an ester group of the silane.

Currently, two major processes, so-called peroxide-curing and water-curing, are being employed in the application of protective coatings such as insulation and jacketing about wires and cables. The peroxide-curing process involves extruding compositions containing an organic peroxide about wires and cables and subjecting the resultant articles to elevated temperatures in order to cure the compositions to crosslinked products. The overall operation requires careful control of the process parameters in order to avoid undue heat and pressure build-up in the extruder. Undue heat and pressure build-up results in premature decomposition of the peroxides which in turn results in crosslinking of the compositions in the extruder. Crosslinking of the compositions in the extruder, commonly referred to as "scorch" necessitates, in extreme cases, stopping the operation and cleaning the extruder. In situations wherein "scorch" occurs but is not as severe, it has been found that the work-life of the ultimate coatings is relatively short. In addition to the processing difficulties of peroxide-curing, the peroxide containing compositions do not have that degree of resistivity to deformation, at normal peroxide loadings, demanded by many ultimate users of insulated and jacketed wire and cable articles.

The water-curing process, on the other hand, involves compositions containing hydrolyzable, silane modified thermoplastic polymers and is more commercially attractive in that a wider latitude in the processing conditions is possible. That is, compositions containing water-curable, silane modified polymers can be extruded at temperatures far in excess of maximum processing temperatures used in extruding peroxide containing compositions. Being capable of extrusion at higher temperatures, such compositions can be extruded at faster rates and under lower pressure and consequently are more cost effective.

A disadvantage with respect to the so-called water-curing process, however, is the water sensitivity of the compositions involved. Compositions containing water-curable, silane modified thermoplastic polymers tend to crosslink under normal conditions of handling and storage. As a result, the relatively poor shelf life of such compositions has limited the wide commercial acceptance of the water-curing process in the United States.

DETAILED DESCRIPTION OF THE INVENTION

The present invention provides for a modification of the water-curing process, which eliminates the problem of poor shelf life while preserving its attractive attributes, previously discussed.

According to the present invention, a relatively water-stable silane is reacted with a thermoplastic polymer to provide a relatively water-stable thermoplastic polymer having pendant silane moieties. The relatively water-stable, silane modified thermoplastic polymer is activated or made readily water-curable by the reaction therewith of an organo titanate having at least one readily hydrolyzable group, which ester exchanges with an ester group of the silane.

The relatively water-stable, silane modified thermoplastic polymers have pendant thereto silane moieties of the formula:

FORMULA I wherein R is a straight chain hydrocarbon radical having a minimum of 4 carbon atoms, generally having 4 to 18 carbon atoms inclusive or a branched chain hydrocarbon radical having a minimum of 3 carbon atoms, generally having 3 to 18 carbon atoms inclusive.

Illustrative of suitable straight chain hydrocarbon radicals for R are alkyl radicals such as n-butyl, n-hexyl, n-heptyl, n-octyl, n-nonyl, n-decyl, n-dodecyl, stearyl, myristyl and the like.

Illustrative of suitable branched chain hydrocarbon radicals for R are alkyl radicals such as isopropyl, sec-butyl, sec-amyl, 4-methyl-2-pentyl and the like.

Each V, which can be the same or different, is a hydrocarbon radical having 1 to 18 carbon atoms inclusive or —OR) wherein R is as previously defined.

Illustrative of suitable hydrocarbon radicals for each V are alkyl radicals having 1 to 18 carbon atoms inclusive, preferably 1 to 6 carbon atoms inclusive such as methyl, ethyl, n-propyl, isopropyl, n-butyl, n-hexyl and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl and the like.

Organo titanates, suitable for purposes of this invention, have the formula:

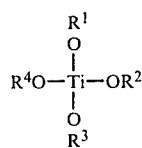

FORMULA II wherein $R^1$ is methyl, ethyl or propyl and $R^2$, $R^3$ and $R^4$, which can be the same or different, are hydrogen or hydrocarbon radicals having 1 to 18 carbon atoms inclusive, preferably 1 to 3 carbon atoms inclusive.

Exemplary of suitable hydrocarbon radicals for $R^2$, $R^3$ and $R^4$ are alkyl radicals such as methyl, ethyl, n-propyl, isopropyl, butyl, octyl, lauryl, myristyl, stearyl and the like; cycloaliphatic radicals such as cyclopentyl, cyclohexyl and the like; aryl radicals such as phenyl, methylphenyl and the like; alkaryl radicals such as benzyl and the like.

Preparation of silane modified thermoplastic polymers which are reacted with organo titanates to produce readily hydrolyzable polymers can be carried out by a number of convenient processes, including:

A. Reacting a thermoplastic polymer with a vinyl silane in the presence of an organic peroxide as described in U.S. Pat. No. 3,646,155, patented Feb. 29, 1972

B. Reacting an alkylene-alkyl acrylate copolymer with a silane in the presence of an organo titanate as described in U.S. Pat. No. 4,291,136, patented Sept. 22, 1981

C. Reacting an alkylene-alkyl acrylate copolymer with a polysiloxane in the presence of an organo titanate as described in U.S. Pat. No. 4,328,323, patented May 4, 1982

D. Reacting a thermoplastic polymer with a silane sulfonyl azide as described in U.S. Pat. No. 3,697,551, patented Oct. 10, 1972

Illustrative of thermoplastic polymers which can be reacted with silanes, according to one or more processes A–D, identified above, are normally solid homopolymers and interpolymers of monoolefins and diolefins.

Suitable polymerizable monoolefins have the general formula:

$$C_\alpha H_{2\alpha} \qquad \text{FORMULA III}$$

wherein $\alpha$ has a value of at least 2. Exemplary of olefins falling within the scope of Formula III are: ethylene, propylene, butene-1, pentene-1, hexene-1, octene-1 and the like.

Suitable polymerizable diolefins have the general formula:

$$C_\beta H_{2\beta-2} \qquad \text{FORMULA IV}$$

wherein $\beta$ has a value of at least 3. Exemplary of diolefins falling within the scope of Formula IV are: propadiene (allene), 1,3-butadiene, 1,4-pentadiene, 2-methyl-1,3-butadiene, 1,4-hexadiene, 1,5-hexadiene, 1,4-octadiene, ethylidene norbornene and the like.

Illustrative of monomers which can be polymerized with monoolefins and/or diolefins are styrene, p-methyl styrene, α-methyl styrene, p-chloro styrene, vinyl naphthalene and similar aryl olefins and substituted aryl olefins, acrylic and substituted acrylic acids, nitriles such as acrylonitrile, methacrylonitrile, α-chloroacrylonitrile and the like; vinyl acetate, vinyl methyl ketone, vinyl methyl ether, vinylidene chloride and similar polymerizable compounds containing a single olefinic double bond, provided that the olefinic content is at least about 0.1 percent by weight, preferably 1 to about 50 percent by weight.

Other suitable polymerizable monomers are the alkyl acrylates which fall within the scope of the following formula:

$$\begin{array}{c} R^6 \\ | \\ CH_2=C-C=O \\ | \\ OR^5 \end{array} \qquad \text{FORMULA V}$$

wherein $R^6$ is hydrogen or methyl and $R^5$ is alkyl having 1 to 8 carbon atoms inclusive. Illustrative compounds encompassed by this formula are: methyl acrylate, ethyl acrylate, t-butyl acrylate, methyl methacrylate, n-butyl acrylate, n-butylmethacrylate, 2-ethylhexyl acrylate, chloroethyl acrylate and the like and mixtures thereof.

Particularly desirable polymers are alkylene-alkyl acrylate copolymers generally having a density (ASTM D-1505 with conditioning as in ASTM D 147-72) of about 0.92 to about 0.94 and a melt index (ASTM D-1238 at 44 psi tested pressure) of about 0.1 to about 500 decigrams per minute. These copolymers generally have about 1 to about 50 percent by weight combined alkyl acrylate, preferably about 2 to about 20 percent by weight combined alkyl acrylate.

It is to be understood that mixtures of olefins falling within the scope of Formula III and/or diolefins falling within the scope of Formula IV can be polymerized to produce suitable polymers.

Preferred polymers are ethylene-propylene copolymers, ethylene-butene copolymers, ethylene-hexene copolymers and the like produced under low pressures on the order of about 15 to 300 psi, using a chromium oxide catalyst modified with titanium as disclosed in U.S. Pat. No. 4,011,382, granted Mar. 8, 1977.

Particularly desirable polymers have densities (ASTM D-1505) of about 0.875 to about 0.970, preferably about 0.875 to about 0.930. These polymers can be prepared by reacting a mixture containing about 50 to about 99.9 mole percent, preferably about 75 to about 96 mole percent ethylene and from about 0.1 to about 50 mole percent and preferably about 4 to about 25 mole percent of one or more $C_3$ to $C_8$ alpha olefins such as propylene, butene-1, pentene-1, 4-methyl-pentene-1, hexene-1, heptene-1, octene-1 and the like.

Other polymers are set forth in U.S. Pat. No. 3,697,551.

Vinyl silanes, which can be reacted with thermoplastic polymers according to process A include among others vinyl-tris(n-butoxy)silane, vinyl-tris(n-pentoxy)silane, vinyl-tris(n-hexoxy)silane, vinyl-tris(N-heptoxy)silane, vinyl-tris(n-octoxy)silane, vinyl-tris(n-dodecyloxy)silane, vinyl-bis(n-butoxy)methyl silane, vinyl-bis(n-pentoxy)methyl silane, vinyl-bis(n-hexoxy)methyl silane, vinyl(n-butoxy)dimethyl silane, vinyl(n-pentoxy)dimethyl silane and the like.

Silanes which can be reacted with thermoplastic polymers according to processes B or C are monomeric silanes or polysiloxanes of such monomeric silanes having the formula:

$$\begin{array}{c} O \qquad\quad V \\ \| \qquad\quad | \\ R^7-C-O(-R^8)_{\overline{n}}Si-OR \\ \qquad\qquad | \\ \qquad\qquad V \end{array} \qquad \text{FORMULA VI}$$

wherein $R^7$ is a hydrocarbon radical, as for example an alkyl radical having 1 to 18 carbon atoms inclusive, preferably 1 to 4 carbon atoms inclusive such as methyl, ethyl, n-propyl, isopropyl, n-butyl and the like; alkylene radicals having 2 to 18 carbon atoms inclusive such as ethylene, propylene and the like; aryl radicals having 6 to 10 carbon atoms inclusive such as phenyl, benzyl and the like; $R^8$ is a hydrocarbon or oxy substituted hydrocarbon radical; each V and R are as previously defined.

Illustrative of suitable radicals for $R^8$ are alkylene radicals having 1 to 18 carbon atoms inclusive, preferably 1 to 6 carbon atoms inclusive, such as methylene, ethylene, propylene, butylene, hexylene and the like; alkoxy radicals having 1 to 18 carbon atoms inclusive, preferably 1 to 6 carbon atoms inclusive such as methyloxymethyl, methyloxypropyl, ethyloxyethyl, ethyloxypropyl, propyloxypropyl, propyloxybutyl, propyloxyhexyl and the like.

Exemplary of suitable silanes falling within the scope of Formula VI are the following:

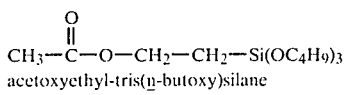
acetoxyethyl-tris(n-butoxy)silane

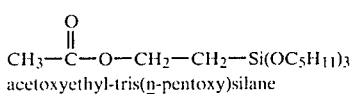
acetoxyethyl-tris(n-pentoxy)silane

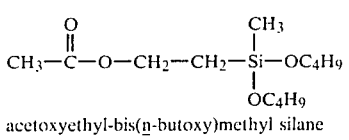
acetoxyethyl-bis(n-butoxy)methyl silane

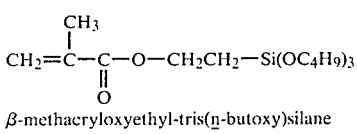
β-methacryloxyethyl-tris(n-butoxy)silane

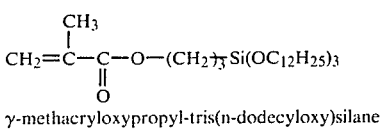
γ-methacryloxypropyl-tris(n-dodecyloxy)silane

Polysiloxanes of such silanes contain repeating units of the formula:

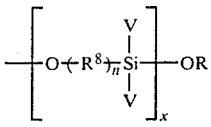
FORMULA VII wherein x is an integer having a value of at least 2, generally 2 to 1000 inclusive, preferably 5 to 25 inclusive and the other variables are as defined.

Silanes which can be reacted with thermoplastic polymers according to process D include, among others, silanes disclosed in U.S. Pat. No. 3,697,551, so that groups attached to the silicon atom, correspond to V and R in Formula I of this specification.

As an alternative method of preparation, a relatively water-stable, silane modified thermoplastic polymer can be prepared by:

1. preparing a readily water-curable, silane modified thermoplastic polymer by any one of processes A–D, described above.
2. rendering the polymer relatively water-stable by reacting a mixture containing the water-curable, silane modified thermoplastic polymer, an organo titanate and an appropriate alcohol.

The reaction of a silane modified thermoplastic polymer with an organo titanate to produce readily water-curable polymers can be conveniently carried out in an apparatus in which the polymer is subjected to mechanical working such as a Banbury mixer, a Brabender mixer or an extruder.

The amount of organo titanate admixed with the silane modified thermoplastic polymer is sufficient to ester exchange at least one ester group of the titanate for one ester group of the silane. Generally, the amount used is about 0.1 to about 20 percent by weight, preferably about 1 to about 5 percent by weight, based on the weight of the silane modified thermoplastic polymer.

The temperature at which this reaction is carried out is not critical and can vary, conveniently, from about 80° C. to about 300° C., and preferably from about 150° C. to about 230° C.

The reaction can be carried out at atmospheric, subatmospheric or superatmospheric pressure, although superatmospheric pressure is preferred, generally up to about 10,000 psi.

Recovery of the silane modified polymer is effected by allowing the contents of the reaction flask to cool and discharging into a suitable receiver for storage, preferably under an inert gas blanket.

The curing or crosslinking of the resultant silane modified polymer is effected by exposing the polymer to moisture. The moisture present in the atmosphere is usually sufficient to permit curing to occur over a period of 48 hours.

The rate of curing, in a matter of 30 minutes, can be accelerated by exposure to an artificially humidified atmosphere or immersion in water, and heating to elevated temperatures or by exposure to steam.

Generally, curing is effected at temperatures on the order of about 23° C. to about 100° C., preferably about 70° C. to about 100° C.

Additionally, the crosslinking may be carried out in the presence of a silanol condensation catalyst. A unique feature of this invention is that the crosslinking reaction can be carried out at significant rates in the absence of added silanol condensation catalyst. The organo titanate reactant present in the production of the silane modified polymers also catalyzes the crosslinking reaction.

Alternatively, a wide variety of materials which function as silanol condensation catalysts and which are known in the art can be employed in the crosslinking process. Such materials include metal carboxylates described in U.S. Pat. No. 4,328,323 and include dibutyltin dilaurate and the like.

To the silane modified polymers of this invention may be added various additives, in amounts well known in the art, such as fillers among which can be mentioned carbon black, clay, talc (magnesium silicate), calcium carbonate, silica, aluminum hydroxide and the like.

The silane modified polymers can be rendered flame retardant by the addition thereto of halogen containing flame retardants such as decabromodiphenyl oxide, chlorinated polyethylene, polyvinyl chloride and halogenated paraffin waxes, alone or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

It is to be noted that the disclosures of all patents noted are incorporated herein by reference. Also, mixtures of materials can be used in carrying out this invention.

The following examples further illustrate the present invention and are not intended to limit the scope thereof.

PREPARATION OF SILANE MODIFIED POLYMERS

Silane modified thermoplastic polymers were prepared according to the procedure described below wherein materials and amounts thereof, in parts by weight, are set forth in Table I.

Into a Brabender mixer, preheated to a temperature of 140° C., there was charged an ethylene-ethyl acrylate copolymer, having a melt index of 3.5 and containing about 17 to 19 percent by weight ethyl acrylate, and polymerized 1,2-dihydro-2,3,4-trimethylquinoline, an antioxidant. The mixture was fluxed and to the fluxed mixture was added a silane, by means of a syringe. The resultant mixture was brought to homogeniety, as evidenced by a stable torque reading. To the homogeneous mixture, there was then added di-α-cumyl peroxide. The contents of the Brabender were brought rapidly, in approximately two minutes, to a temperature of 185° C. by increasing the mixing rate, and maintained at a temperature of 185° C. for an additional 5 minutes to insure completion of the grafting reaction between the copolymer and the silane. The silane modified polymer was charged into a container, which was then sealed and stored under argon gas.

The 16 hour determinations were taken to be the maximum "crosslink" readings.

The data of Table II show that the larger or "bulkier" the substituent of the silane, the slower the cross-linking reaction. Consequently, such silane modified polymers have a longer shelf life under normal conditions of handling, storage and distribution.

TABLE II

CROSSLINKING RATES OF SILANE MODIFIED EEA COPOLYMER RESINS AT 121° C. (PRESSURE COOKER) IN THE PRESENCE OF DIBUTYLTIN DILAURATE

| —Si(OR)₃ OR = | A n-Butoxy | | B n-Dodecyloxy | | C Isobutoxy | | D Methoxy | |
|---|---|---|---|---|---|---|---|---|
| Time (hrs) | Lbs-inch | % Final | Lbs-inch | % Final | Lbs-inch | % Final | Lbs-inch | % Final |
| 0.0[1] (initial) | 3 | | 3 | | 3 | | 3 | |
| 0.0[2] | 6 | 9 | 3 | 0 | 4 | 9 | 8 | 9 |
| 0.5 | 12 | 27 | 7 | 15 | 7 | 16 | 33 | 97 |
| 1.0 | 15 | 36 | 11 | 29 | 11 | 33 | 33 | 97 |
| 4.0 | 21 | 55 | 12 | 33 | 10 | 29 | 33 | 97 |
| 16.0 (final cure) | 36 | 100 | 30.5 | 100 | 27.5 | 100 | 34 | 100 |

[1]Rheometer reading before compounding in dibutyltin dilaurate
[2]Rheometer reading after compounding in dibutyltin dilaurate $$\text{Percent Of Final Cure} = \frac{\text{lbs-inch measured minus lbs-inch initial}}{\text{lbs-inch final minus lbs-inch initial}} \times 100$$

TABLE 1

|  | A | B | C | D |
|---|---|---|---|---|
| Ethylene-Ethyl Acrylate Copolymer | 100 | 100 | 100 | 100 |
| Vinyl-tris(n-butoxy)silane | 6.48 | — | — | — |
| Vinyl-tris(n-dodecyloxy)silane | — | 14.4 | — | — |
| Vinyl-tris(isobutoxy)silane | — | — | 6.48 | — |
| Vinyl-tris(methoxy)silane | — | — | — | 3.5 |
| Antioxidant | 0.1 | 0.1 | 0.1 | 0.1 |
| Di-α-cumyl peroxide | 0.3 | 0.3 | 0.3 | 0.3 |

Test plaques, 3 inches by 3 inches by 0.0075 inch, were prepared from Polymers A-D, unmodified and modified by the addition of dibutyltin diluarate, in a 5 minute molding cycle at a temperature of 110° C.-115° C. and under a pressure of 5000 psig.

Test plaques were subjected to the Monsanto Rheometer test, described in detail in U.S. Pat. No. 4,018,852, which is a measure of the degree of crosslinking. A higher reading indicates a higher degree of crosslinking.

Addition of dibutyltin dilaurate to Polymers A-D was carried out as follows:

Forty gram samples of each polymer were fluxed in a Brabender mixer at a temperature of 130° C. for 2 minutes. To each fluxed polymer there was then added 0.012 gram of dibutyltin dilaurate and the resultant mixture blended for one minute at a temperature of 130° C.

Test plaques were placed in a pressure cooker, which was at a temperature of 121° C., and Rheometer determinations were made on plaques which had been so exposed for 30 minutes, one hour, 4 hours and 16 hours.

Test plaques, prepared as previously described, without the addition of dibutyltin dilaurate, were tested for Rheometer readings at various intervals after aging at ambient conditions and also at various intervals after immersion in a water bath which was at a temperature of 70° C. Data are tabulated in Tables III and IV.

TABLE III

CROSSLINKING RATE OF SILANE MODIFIED EEA COPOLYMER (PLAQUES) AGED IN AMBIENT AIR IN THE ABSENCE OF SILANOL CONDENSATION CATALYST

| | A | B | C | D |
|---|---|---|---|---|
| | Percent of Final Cure[1] | | | |
| —Si(OR)₃ OR= | n-Butoxy | n-Dodecyloxy | Isobutoxy | Methoxy |
| Time (Days) | | | | |
| 0.0 | 0 | 0 | 0 | 0 |
| 1.0 | 0 | 0 | 0 | 3 |
| 4.0 | 0 | 0 | 0 | 7 |
| 10 | 0 | 0 | 0 | 10 |
| 21 | 0 | 0 | 0 | 14 |
| 42 | 0 | 0 | 4 | 18 |

[1]Final cure reported in Lbs-inch in Table II

TABLE IV

CROSSLINKING RATE OF SILANE MODIFIED EEA COPOLYMER (PLAQUES) IMMERSED IN WATER (70° C.) IN ABSENCE OF ADDED SILANOL CONDENSATION CATALYST

| | A | B | C | D |
|---|---|---|---|---|
| | Percent of Final Cure[1] | | | |
| —Si(OR)₃ OR= | n-Butoxy | n-Dodecyloxy | Isobutoxy | Methoxy |
| Time (hrs) | | | | |
| 0.0 | 0 | 0 | 0 | 0 |
| 1.0 | 0 | 0 | 0 | 0 |
| 4.0 | 3 | 0 | 0 | 3 |
| 8.0 | 6 | 4 | 4 | 10 |
| 30 | 3 | 0 | 4 | 13 |
| 168 | 9 | 11 | 37 | 70 |
| 336 | 15 | 25 | 37 | 100 |

[1]Final cure reported in Lbs-inch in Table II

Test plaques, prepared as previously described, with the addition of dibutyltin dilaurate, were tested for Rheometer readings at various intervals after aging at ambient conditions and also at various intervals after immersion in a water bath which was at a temperature of 70° C. Data are tabulated in Tables V and VI.

TABLE V
CROSSLINKING RATE OF SILANE MODIFIED EEA COPOLYMER (PLAQUES) AGED IN AMBIENT AIR AND CONTAINING DIBUTYLTIN DILAURATE AS ADDED SILANOL CONDENSATION CATALYST

| | A | B | C | D |
|---|---|---|---|---|
| | \multicolumn{4}{c}{Percent of Final Cure[1]} | | | |
| —Si(OR)$_3$ OR= | n-Bu-toxy | n-Dodecyloxy | Isobutoxy | Methoxy |
| Time (Days) | | | | |
| 0 | 0 | 0 | 0 | 0 |
| 1 | 6 | 7 | 4 | 69 |
| 8 | 30 | 18 | 4 | 69 |
| 28 | 67 | 40 | 24 | 100 |

[1]Final cure reported in Lbs-inch in Table II

TABLE VI
CROSSLINKING RATE OF SILANE MODIFIED EEA COPOLYMER (PLAQUES) AGED IN 70° C. WATER AND CONTAINING DIBUTYLTIN DILAURATE AS ADDED SILANOL CONDENSATION CATALYST

| | A | B | C | D |
|---|---|---|---|---|
| | \multicolumn{4}{c}{Percent of Final Cure[1]} | | | |
| —Si(OR)$_3$ OR= | n-Bu-toxy | n-Dodecyloxy | Isobutoxy | Methoxy |
| Time (hrs) | | | | |
| 0.0 | 0 | 0 | 0 | 0 |
| 1 | 39 | 10 | 0 | 100 |
| 4 | 42 | 22 | 8 | |
| 30 | 100 | 100 | 45 | |
| 168 | 100 | 100 | 77 | |
| 336 | 100 | 100 | 90 | |

[1]Final cure reported in Lbs-inch in Table II

A number of compositions were formulated and tested, showing the effect of an organo titanate ester exchange with a silane modified copolymer on the hydrolysis crosslinking rate of the silane modified copolymer.

The test results are tabulated in Table VII.

A silane modified polymer was prepared in a manner as previously described by reacting a mixture containing:

| | Parts by Weight |
|---|---|
| Ethylene-ethyl acrylate copolymer (previously described) | 100 |
| Vinyl-tris(n-dodecyloxy)silane | 15.4 |
| Di-α-cumyl peroxide | 0.4 |
| Polymerized 1,2-dihydro-2,3,4-trimethyl-quinoline | 0.1 |

The silane modified polymer was then reacted with an organo titanate at the compound temperatures noted, in Table VII, formed into plaques in a manner previously described and subjected to the Monsanto Rheometer test.

TABLE VII

| | Control 1 | Example 1 | | Control 2 | | Example 2 | | Example 3 | |
|---|---|---|---|---|---|---|---|---|---|
| Silane modified polymer | 100 | 100 | | 100 | | 100 | | 100 | |
| Tetramethyl titanate | — | 3.0 | | — | | 3.0 | | 5.0 | |
| Dibutyltin dilaurate | — | — | | 0.03 | | 0.03 | | — | |
| Compound Temperature, °C. | 200 | 150 | 200 | 150 | 200 | 150 | 200 | 100 | 200 |
| Monsanto Rheometer (Lbs-Inch) | | | | | | | | | |
| Aged 70° C. H$_2$O (hrs) | | | | | | | | | |
| 0 | 4 | 5.5 | 6.0 | 2 | 2 | 2 | 3 | 4 | 4 |
| 0.5 | | 23 | 29 | 4 | 5 | 16 | 15 | | |
| 1.0 | 4 | 26 | 29 | 4 | 5 | 16 | 16 | 11 | 28 |
| 2.0 | | 27 | 29 | | | | | | |
| 4.0 | | 28 | 29 | 7 | 7 | 22 | 25 | | |
| 16.0 | | 27 | 32 | 16 | 13 | 33 | 33 | | |
| 28.0 | 5 | | | | | | | | |
| 72.0 | | 33 | 39 | | | | | | |
| 96.0 | | | | 22 | 21 | 27 | 28 | | |
| Aged Ambient Air (days) | | | | | | | | | |
| 1 | | 9 | 14 | 3 | 3 | 4 | 8 | | |
| 4 | | 22 | 22 | 9.0 | 10 | 12 | 22 | | |
| 13 | | 34 | 34 | | | | | | |
| 21 | | 33 | 38 | 10 | 10 | 30 | 29 | | |

Compositions noted were compounded at a temperature of 150° C. for 3 minutes, formed into plaques in a manner previously described and subjected to the Monsanto Rheometer test at intervals noted below.

| | Percent by Weight | |
|---|---|---|
| | Formulation 1 | Formulation 2 |
| Silane modified Polymer B of Table I | 40 | — |
| Silane modified polymer, reaction product of a mixture of vinyl-tri(methoxy)silane (5 parts by weight), ethylene-ethyl acrylate copolymer previously described (100 parts by weight), di-α-cumyl peroxide (0.15 parts by weight) | — | 40 |
| Aluminum trihydrate | 60 | 60 |
| Monsanto Rheometer of silane modified polymer | 4 Lbs-inch | 7 Lbs-inch |
| Monsanto Rheometer of composition (no aging) | 9 Lbs-inch | 33 Lbs-inch |
| Monsanto Rheometer of composition after water exposure 16 hours in water bath which was at a temperature of 70° C. and 4 hours in water bath at a temperature of 121° C. | 11 Lbs-inch | 63 Lbs-inch |

Formulation 2 was prematurely crosslinked and could not be extrusion processed.

EXAMPLE 4

The following example illustrates the preparation of a water-curable silane modified polymer by first forming a shelf stable polymer and then using an organo titanate to ester exchange functional groups with the silane.

A composition, the formulation of which is disclosed below was compounded in a Brabender mixer for five minutes at a temperature of 130° C., formed into plaques in a manner previously described and subjected to the Monsanto Rheometer test.

|  | Percent by Weight |
| --- | --- |
| Silane modified Polymer B of Table 1 | 36.8 |
| Aluminum trihydrate | 50.1 |
| Zinc borate | 7.9 |
| Vinyl-tris(2-methoxyethoxy)silane (lubricant) | 0.7 |
| Polymerized 1,2-dihydro,2,3,4-trimethylquinoline | 0.6 |
| 2-ethylhexyl diphenylphosphate (plasticizer) | 3.9 |
| Monsanto Rheometer | 9 Lbs-inch |

To 100 parts by weight of the composition described above, there was added 3 parts by weight tetramethyl titanate and the mixture compounded in a Banbury mixer for three minutes at a temperature of 150° C. The reacted mixture was formed into plaques in a manner previously described and subjected to the Monsanto Rheometer test after aging for periods of time and under conditions noted below.

|  | Monsanto Rheometer Lbs-inch |
| --- | --- |
| Aged in a Water Bath which was At a Temperature of 70° C. (Hours) |  |
| 0.5 | 58 |
| 1.0 | 88 |
| 2.0 | 86 |
| Aged at Ambient Conditions (Air) (Days) |  |
| 1 | 25 |
| 3 | 96 |
| 28 | 99 |

EXAMPLE 5

Into a Brabender mixer, preheated to a temperature of 140° C., there was charged 100 parts by weight of polyethylene homopolymer having a melt index of 2.0 The polymer was fluxed and to the fluxed polymer was added 18.1 parts by weight vinyltris(n-dodecyloxy)silane. The resultant mixture was brought to homogeniety, as evidenced by a stable torque reading. To the homogeneous mixture, there was then added 17.6 parts by weight of a masterbatch composition of polyethylene (described above) containing 1.5 percent by weight di-α-cumyl peroxide and 0.1 percent by weight of a hindered phenol (Irganox-1010). The contents of the Brabender were brought rapidly, in approximately two minutes, to a temperature of 185° C. by increasing the mixing rate, and maintained at a temperature of 185° C. for an additional 5 minutes to insure completion of the grafting reaction between the polyethylene and the silane. The silane modified polymer was charged into a container, which was then sealed under argon gas.

Two test plaques were prepared from the composition, in a manner previously described and the test plaques subjected to the rheometer test.

Rheometer reading—6 lbs-inch (No water treatment)

The second test plaque was immersed in a water bath, which was at a temperature of 70° C., for 16 hours and then subjected to the rheometer test.

Rheometer reading—6 lbs-inch

A test plaque was prepared from the "grafted" polymer, described above, which was modified by the addition of 0.03 percent by weight dibutyltindilaurate. This addition was effected as previously described. The plaque was immersed in a water bath, which was at a temperature of 70° C., for 16 hours and then subjected to the rheometer test.

Rheometer reading—19 lbs-inch

A plaque was also prepared from a reacted mixture of the "grafted" polyethylene, described above, and tetramethyl titanate. The polymer and 5 percent by weight tetramethyl titanate were reacted, in a Brabender mixer, for five minutes at a temperature of 200° C.

The plaque was immersed in a water bath, which was at a temperature of 70° C. for 16 hours and then subjected to the rheometer test.

Rheometer reading—36 lbs-inch

The compositions of this invention have been described in terms of coverings about wires and cables. It is to be understood, however, that the compositions find utility as moldable compositions, to be molded into shaped articles such as pipes, containers, film and the like, as well as applied as coatings or laminates to film material.

What is claimed is:

1. A composition of matter comprising a preformed thermoplastic polymer havin pendant silane moieties of the formula:

wherein R is a straight chain hydrocarbon radical having a minimum of 4 carbon atoms or a branched chain hydrocarbon radical having a minimum of 3 carbon atoms, each V is a hydrocarbon radical having 1 to 18 carbon atoms inclusive or an —OR radical wherein R is as previously defined; and an organo titanate of the formula:

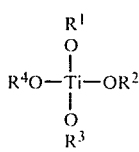

wherein $R^1$ is methyl, ethyl or propyl and $R^2$, $R^3$ and $R^4$ are hydrogen or hydrocarbon radicals having 1 to 18 carbon atoms inclusive; wherein said organo titanate is present in an amount sufficient to ester exchange at least one ester group of the titanate for one ester group of the silane.

2. A composition of matter as defined in claim 1 wherein said organo titanate is present in an amount of about 0.1 to about 20 percent by weight based on the weight of said polymer.

3. A composition of matter as defined in claim 1 wherein said organo titanate is present in an amount of about 1 to about 5 percent by weight based on the weight of said polymer.

4. A composition of matter comprising a preformed thermoplastic polymer having pendant silane moieties of the formula:

wherein R is a straight chain hydrocarbon radical having 4 to 18 carbon atoms inclusive or a branched chain hydrocarbon radical having 3 to 18 carbon atoms inclusive, each V is a hydrocarbon radical having 1 to 18 carbon atoms inclusive or an —OR radical wherein R is as previously defined; and an organo titanate of the formula:

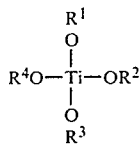

wherein $R^1$ is methyl, ethyl or propyl and $R^2$, $R^3$ and $R^4$ are hydrogen or hydrocarbon radicals having 1 to 4 carbon atoms inclusive; wherein said organo titanate is present in at least an amount sufficient to ester exchange one ester group of the titanate for one ester group of the silane.

5. A composition of matter as defined in claim 1 wherein the organo titanate is tetramethyl titanate.

6. A composition of matter as defined in claim 1 wherein the thermoplastic polymer is an olefin polymer.

7. A composition of matter as defined in claim 6 wherein the olefin polymer is polyethylene.

8. A composition of matter as defined in claim 6 wherein the olefin polymer is a copolymer of ethylene and ethyl acrylate.

9. A composition of matter as defined in claim 1 wherein the silane moieties are derived from vinyl tris(n-butoxy)silane.

10. A composition of matter as defined in claim 1 wherein the silane moieties are derived from vinyl tris-(isobutoxy)silane.

11. A composition of matter as defined in claim 1 wherein the silane moieties are derived from vinyl tris(-dodecyloxy)silane.

12. A composition of matter comprising a preformed ethylene-ethyl acrylate copolymer having pendant silane moieties of the formula:

wherein R is a straight chain hydrocarbon radical having a minimum of 4 carbon atoms or a branched chain hydrocarbon radical having a minimum of 3 carbon atoms, each V is a hydrocarbon radical having 1 to 18 carbon atoms inclusive or an —OR radical wherein R is as previously defined and tetramethyl titanate in an amount sufficient to ester exchange at least one ester group of the titanate for one ester group of the silane.

13. A composition of matter as defined in claim 12 wherein the silane moiety is derived from vinyl tris(n-butoxy)silane.

14. A composition of matter as defined in claim 12 wherein the silane moiety is derived from vinyl tris-(isobutoxy)silane.

15. A composition of matter as defined in claim 12 wherein the silane moiety is derived from vinyl tris(-dodecyloxy)silane.

16. A composition as defined in claim 1 containing a silanol condensation catalyst.

17. A composition as defined in claim 16 wherein the silanol condensation catalyst is dibutyltin dilaurate.

18. A process of producing a hydrolyzable, silane modified thermoplastic polymer which comprises reacting a mixture containing a thermoplastic polymer having pendant silane moieties of the formula:

wherein R is a straight chain hydrocarbon radical having a minimum of 4 carbon atoms or a branched chain hydrocarbon radical having a minimum of 3 carbon atoms, each V is a hydrocarbon radical having 1 to 18 carbon atoms inclusive or an —OR radical wherein R is as previously defined; and an organo titanate of the formula:

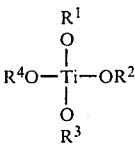

wherein $R^1$ is methyl, ethyl or propyl and $R^2$, $R^3$ and $R^4$ are hydrogen or hydrocarbon radicals having 1 to 18 carbon atoms inclusive, wherein said organo titanate is present in an amount sufficient to ester exchange at least one ester group of the titanate for one ester group of the silane.

19. A process as defined in claim 18 wherein said organo titanate is present in an amount of about 0.1 to about 20 percent by weight based on the weight of said polymer.

20. A process as defined in claim 18 wherein said organo titanate is present in an amount of about 1 to about 5 percent by weight based on the weight of said polymer.

21. A process as defined in claim 18, carried out at a temperature of about 80° C. to about 300° C.

22. A process as defined in claim 18, carried out at a temperature of about 150° C. to about 230° C.

23. A process as defined in claim 18 carried out at super-atmopsheric pressure.

24. A process as defined in claim 18 wherein the said thermoplastic polymer is an ethylene-ethyl acrylate copolymer having pendant silane groups derived from vinyl tris(n-dodecyloxy)silane and said titanate is tetramethyl titanate.

25. A process as defined in claim 18 wherein a silanol condensation catalyst is added to the mixture after completion of the ester exchange reaction.

26. A process as defined in claim 25 wherein the silanol condensation catalyst is dibutyltin dilaurate.

27. A composition of matter as defined in claim 1 wherein the thermoplastic polymer is a polymer of ethylene and at least one $C_3$ to $C_8$ alpha olefin.

28. A composition of matter as defined in claim 27 wherein the alpha olefin is propylene.

29. A composition of matter as defined in claim 27 wherein the alpha olefin is butene.

30. A composition of matter as defined in claim 1 wherein the thermoplastic polymer is an alkylene-alkyl acrylate copolymer.

31. A composition of matter as defined in claim 1 wherein the thermoplastic polymer having pendant silane moieties is the reaction product of a thermoplastic polymer and a vinyl silane.

32. A composition of matter as defined in claim 1 wherein the thermoplastic polymer having pendant silane moieties is the reaction product of an alkylene-alkyl acrylate copolymer and a silane.

33. A composition of matter as defined in claim 1 wherein the thermoplastic polymer having pendant silane moieties is the reaction product of an alkylene-alkyl acrylate copolymer and a polysiloxane.

34. A composition of matter as defined in claim 1 wherein the thermoplastic polymer having pendant silane moieties is the reaction product of a thermoplastic polymer and a silane sulfonyl azide.

35. A composition of matter comprising a preformed olefin polymer having pendant silane moieties of the formula:

wherein R is a straight chain hydrocarbon radical having a minimum of 4 carbon atoms or a branched chain hydrocarbon radical having a minimum of 3 carbon atoms, each V is a hydrocarbon radical having 1 to 18 carbon atoms inclusive or an —OR radical wherein R is as previously defined and tetramethyl titanate.

36. A composition of matter as defined in claim 35 wherein the olefin polymer is a polymer of ethylene and at least one $C_3$ to $C_8$ alpha olefin.

37. A composition of matter as defined in claim 35 wherein the alpha olefin is propylene.

38. A composition of matter as defined in claim 35 wherein the alpha olefin is butene.

* * * * *

UNITED STATES PATENT AND TRADEMARK OFFICE
CERTIFICATE OF CORRECTION

PATENT NO.   : 4,526,930
DATED        : July 2, 1985
INVENTOR(S)  : M.J. Keogh

It is certified that error appears in the above-identified patent and that said Letters Patent is hereby corrected as shown below:

Column 2, line 31    "—OR)" should read -- –(OR) --

Column 4, line 32    "(N-heptoxy)-" should read -- (n-heptoxy)- --

Claim 1, line 2      "havin" should read -- having --

Signed and Sealed this

Seventh Day of January 1986

[SEAL]

Attest:

Attesting Officer

DONALD J. QUIGG

Commissioner of Patents and Trademarks

UNITED STATES PATENT AND TRADEMARK OFFICE
CERTIFICATE OF CORRECTION

PATENT NO. : 4,526,930
DATED : July 2, 1985
INVENTOR(S) : Michael J. Keogh

It is certified that error appears in the above-identified patent and that said Letters Patent is hereby corrected as shown below:

Claim 37, line 1; "claim 35" should read -- claim 36 --

Claim 38, line 1; "claim 35" should read -- claim 36 --

Signed and Sealed this

Eighth Day of April 1986

[SEAL]

Attest:

DONALD J. QUIGG

Attesting Officer          Commissioner of Patents and Trademarks